(12) United States Patent
Wood

(10) Patent No.: US 8,047,153 B2
(45) Date of Patent: Nov. 1, 2011

(54) SOLAR POWERED KAYAK OUTRIGGER

(76) Inventor: Scott A. Wood, Buffalo, NY (US)

( * ) Notice: Subject to any disclaimer, the term of this patent is extended or adjusted under 35 U.S.C. 154(b) by 0 days.

(21) Appl. No.: 12/423,930

(22) Filed: Apr. 15, 2009

(65) Prior Publication Data

US 2010/0009579 A1      Jan. 14, 2010

Related U.S. Application Data

(60) Provisional application No. 61/124,253, filed on Apr. 15, 2008.

(51) Int. Cl.
*B63B 1/00* (2006.01)

(52) U.S. Cl. .................... 114/292; 114/61.1; 440/6

(58) Field of Classification Search .............. 114/61.1, 114/61.12, 61.13, 61.14, 292; 440/6
See application file for complete search history.

(56) References Cited

U.S. PATENT DOCUMENTS

| | | | |
|---|---|---|---|
| 4,497,272 A | 2/1985 | Veazey | |
| D349,270 S | 8/1994 | Ito et al. | |
| 5,582,126 A | 12/1996 | Rypinski | |
| D394,629 S | 5/1998 | Lincoln | |
| 5,937,785 A | 8/1999 | Murray, III | |
| 6,000,353 A * | 12/1999 | De Leu | 114/61.1 |
| 6,807,919 B1 | 10/2004 | Thomsen | |
| 6,848,442 B2 | 2/2005 | Haber | |
| 6,855,016 B1 | 2/2005 | Jansen | |
| 7,047,902 B1 * | 5/2006 | Little | 114/61.1 |
| 2006/0102063 A1 | 5/2006 | Boelryk | |
| 2007/0017431 A1 | 1/2007 | Hopkins | |
| 2007/0107646 A1 | 5/2007 | Alvarez-Calderon | |
| 2007/0125285 A1 | 6/2007 | Conrad | |
| 2008/0299842 A1 * | 12/2008 | Ellis et al. | 440/6 |

FOREIGN PATENT DOCUMENTS

| | | |
|---|---|---|
| CH | 675836 | 11/1990 |
| FR | 2796036 | 1/2001 |
| WO | 2007050048 | 5/2007 |

OTHER PUBLICATIONS

The SPK-1 is an outrigger attachment that allows you to use the sun to propel your kayak through the water. Solar Powered Kayaks, http://www.solarpoweredkayak.com; Jan. 27, 2011.

* cited by examiner

*Primary Examiner* — Lars A Olson

(74) *Attorney, Agent, or Firm* — Simpson & Simpson, PLLC

(57) ABSTRACT

An outrigger for attachment to a host vessel, including: a flotation pod; a frame connected to the pod and connectable to the host vessel; at least one solar cell mounted on the frame; a battery connected to the at least one cell; and an electric motor mounted on the frame and connected to the battery.

3 Claims, 9 Drawing Sheets

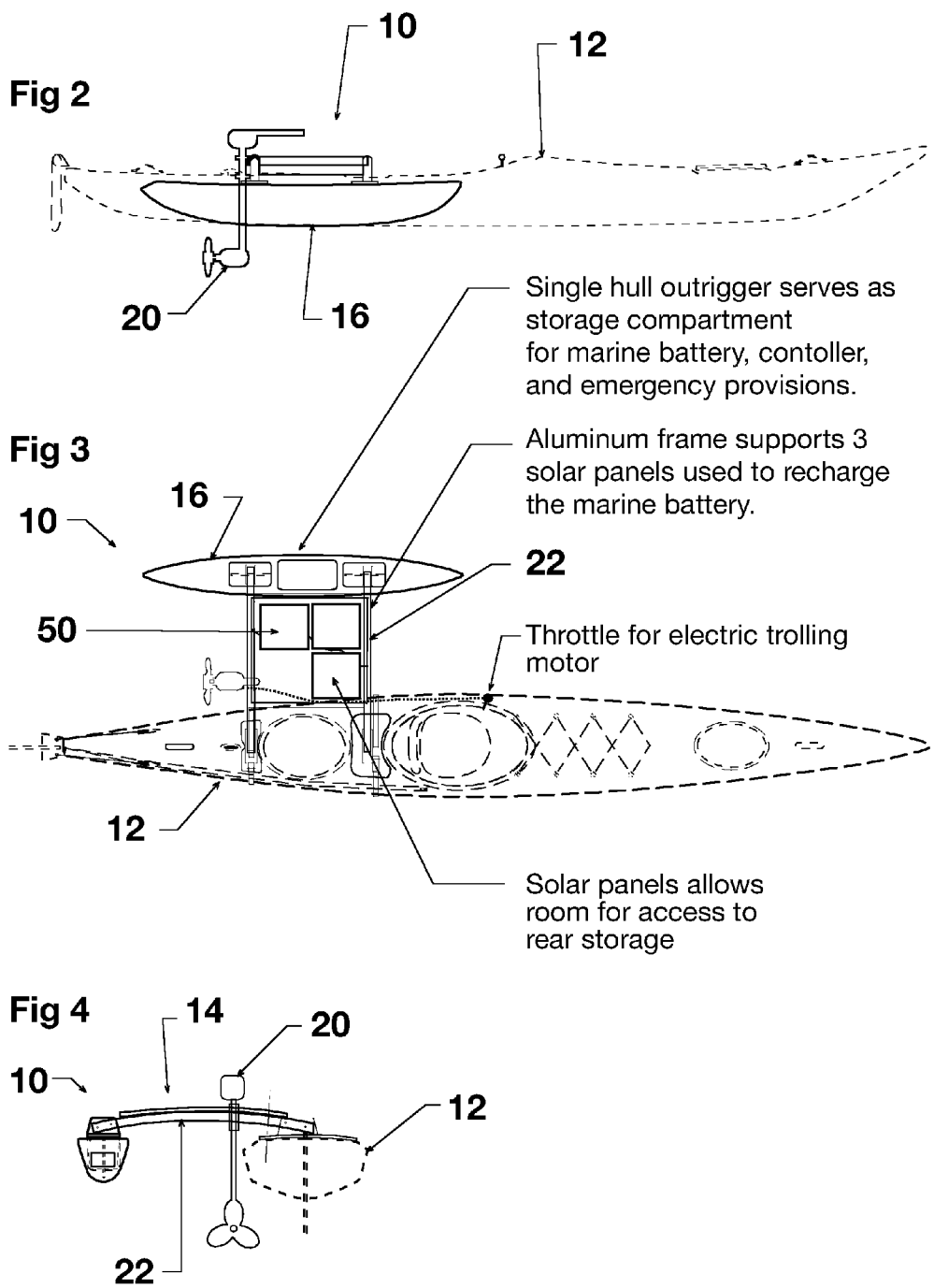

44

26

42

Flange of bracket fiberglas'ed into top surface of pod.

Flanged bracket is epoxied into the foam of the pontoon and then glassed over the top plate

26

26

26

34

Plastic coated steel strap wraps around the kayak and buckles to clasp

28

40

Fig 9A
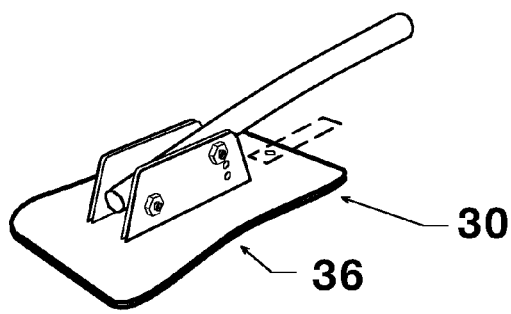
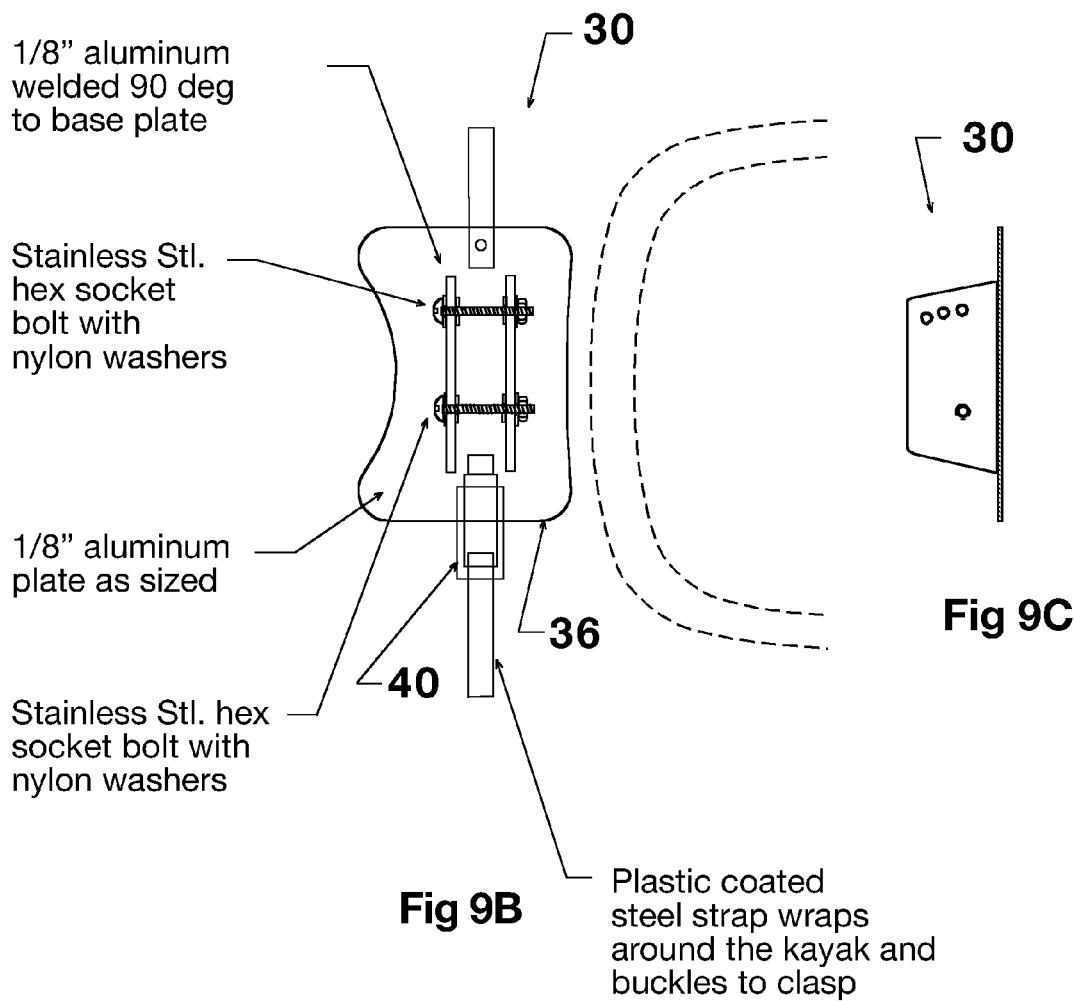
Fig 9B
Fig 9C

16 fiberglass coated foam flotation pod used to keep outrigger afloat

16

SOLAR POWERED KAYAK OUTRIGGER

This application claims the benefit under 35 U.S.C. §119(e) of U.S. Provisional Application No. 61/124,253, filed Apr. 15, 2008.

FIELD OF THE INVENTION

The present invention relates generally to recreational watercraft, in particular, a detachable outrigger with a solar power system and able to accept various ancillary equipment, such as a sail.

BACKGROUND OF THE INVENTION

Recreational boats and solar power systems are each known in separate applications.

BRIEF SUMMARY OF THE INVENTION

The present invention broadly comprises an outrigger for attachment to a host vessel, including: a flotation pod; a frame connected to the pod and connectable to the host vessel; at least one solar cell mounted on the frame; a battery connected to the at least one cell; and an electric motor mounted on the frame and connected to the battery.

BRIEF DESCRIPTION OF THE DRAWINGS

The nature and mode of operation of the present invention will now be more fully described in the following detailed description of the invention taken with the accompanying drawing figures, in which:

FIG. 2 is a side view of the kayak outrigger and kayak shown in FIG. 1;

FIG. 3 is a plan view of the kayak outrigger and kayak shown in FIG. 1;

FIG. 4 is a back view of the kayak outrigger and kayak shown in FIG. 1;

FIGS. 9A-9C are perspective, plan, and side views, respectively, of the front mounting bracket shown in FIG. 5;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
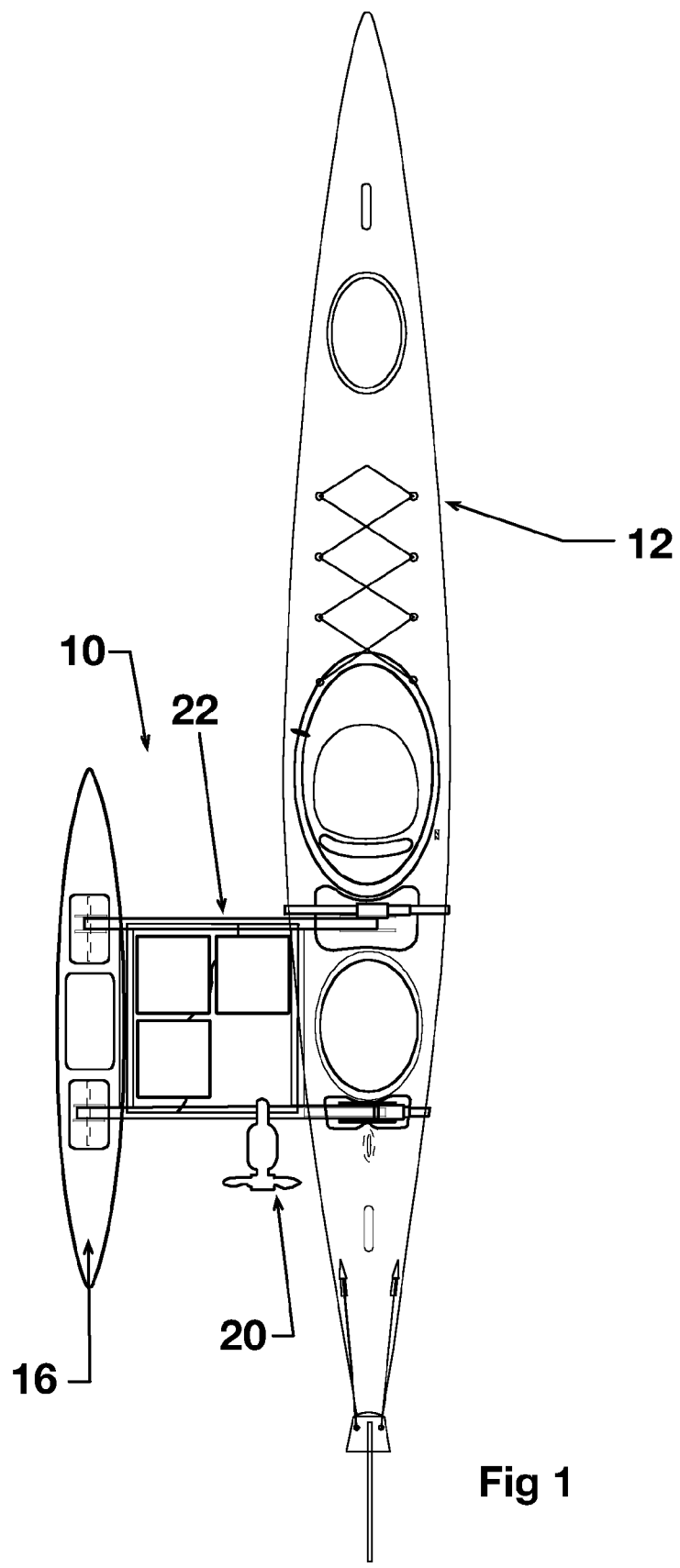
FIG. 1 is a plan view of a present invention kayak outrigger attached to a kayak.

FIG. 1 is a plan view of present invention kayak outrigger 10 attached to kayak 12.

FIG. 2 is a side view of kayak outrigger 10 shown in FIG. 1.

FIG. 3 is a plan view of kayak outrigger 10 and kayak 12 shown in FIG. 1.

FIG. 4 is a back view of kayak outrigger 10 and kayak 12 shown in FIG. 1.

Figure 5:
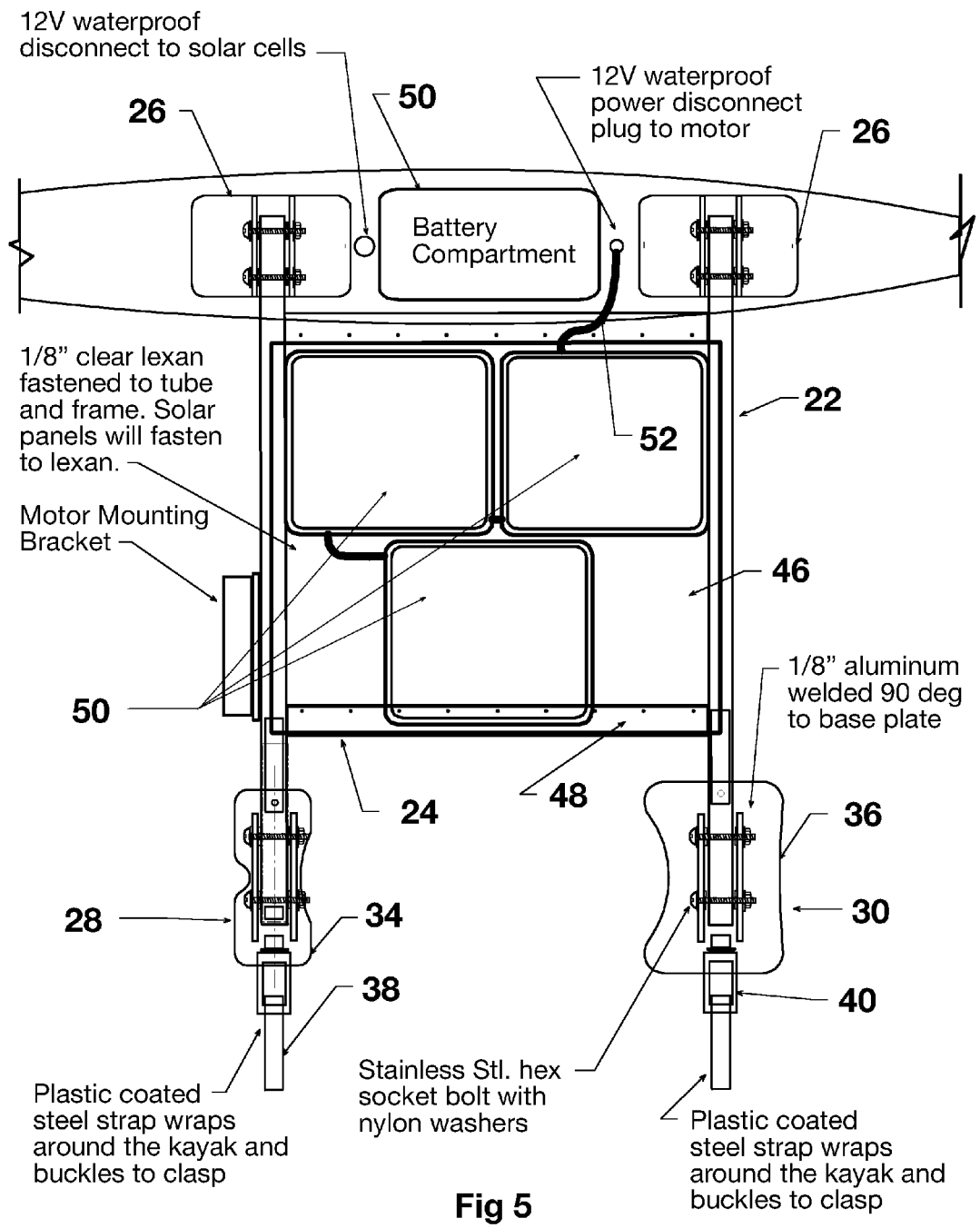
FIG. 5 is a partial plan view of the kayak outrigger and kayak shown in FIG. 1.

FIG. 5 is a partial plan view of kayak outrigger 10 and kayak 12 shown in FIG. 1.

Figure 6:
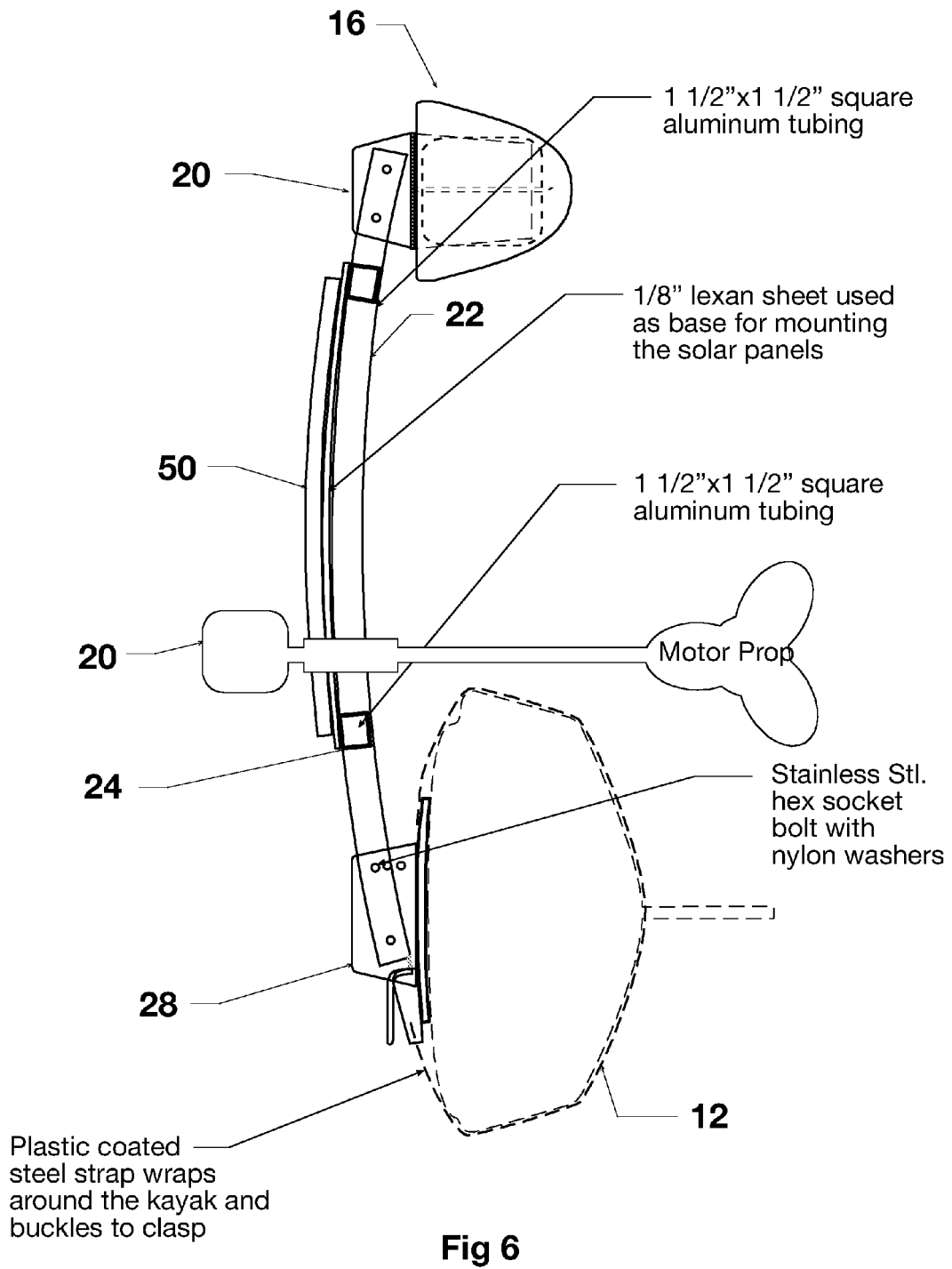
FIG. 6 is a back view of the kayak outrigger and kayak shown in FIG. 1.

FIG. 6 is a back view of kayak outrigger 10 and kayak 12 shown in FIG. 1 providing further detail. The following should be viewed in light of FIGS. 1-6. Kayak outrigger 10 includes frame 14, flotation pod 16, solar cells 18, and electric motor 20 for propulsion. Kayak 12 can be any kayak known in the art. In an exemplary embodiment, the kayak is a sea kayak, for example, as shown in the figures. Frame 14 can be made of any material known in the art. In an exemplary embodiment, the frame is made of aircraft grade aluminum. In an exemplary embodiment, the frame includes arching ribs 22 and cross members 24. In an exemplary embodiment, the ribs use 1½" O.D×⅛" wall aluminum tubing welded to cross members of ¾"×1½"×⅛" wall rectangular aluminum. However, it should be understood that other dimensions and shapes for the ribs and cross members are included in the spirit and scope of the claimed invention.

Figure 7A:
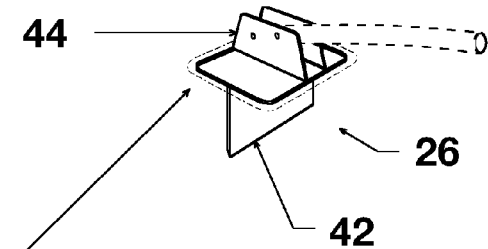
FIGS. 7A-7C are perspective front, plan, and perspective side views, respectively, of the pod mounting bracket shown in FIG. 5.
Figure 7B:
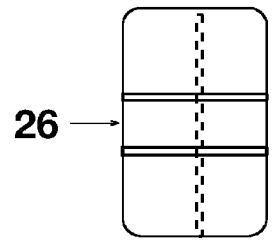
Figure 7C:
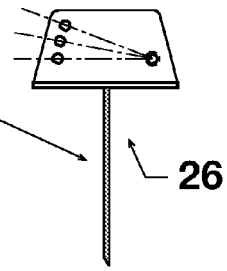

FIGS. 7A-7C are perspective front, plan, and perspective side views, respectively, of pod mounting brackets 26 shown in FIG. 5.

Figure 8A:
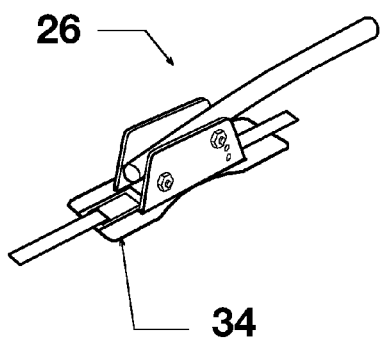
FIGS. 8A and 8B are perspective side and plan views, respectively, of the rear mounting bracket shown in FIG. 5.
Figure 8B:
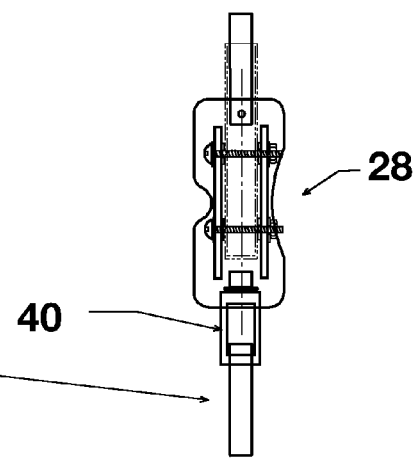

FIGS. 8A and 8B are perspective side and plan views, respectively, of rear mounting bracket 28 shown in FIG. 5.

FIGS. 9A-9C are perspective, plan, and side views, respectively, of front mounting bracket 30 shown in FIG. 5.

Figures 10A, 10B:
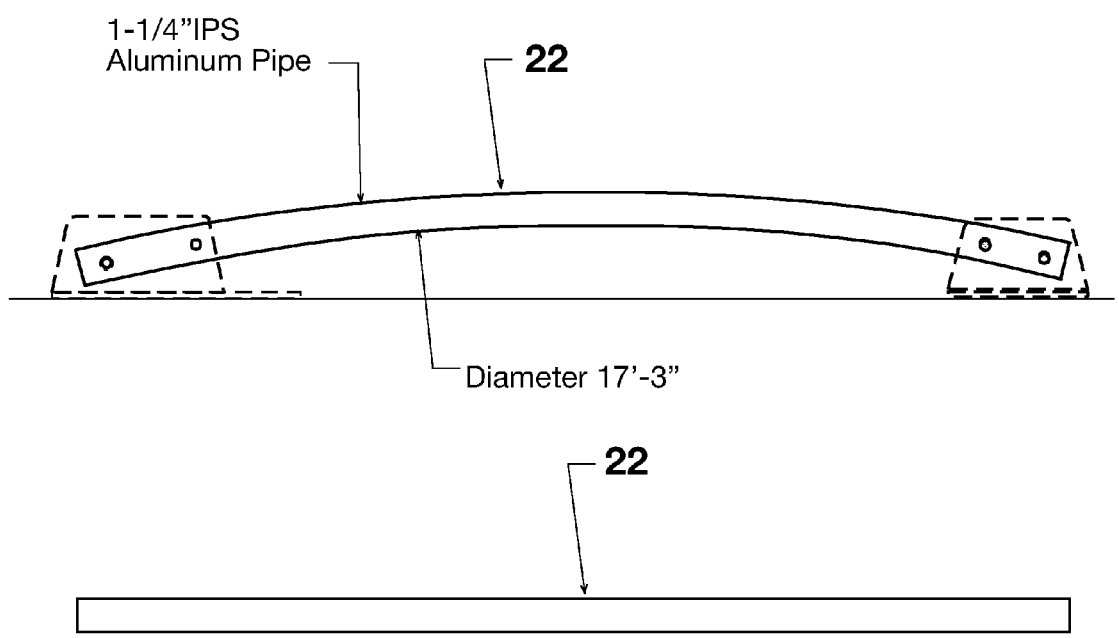
FIGS. 10A and 10B are side and plan views, respectively, of the cross arm shown in FIG. 5.

FIGS. 10A and 10B are side and plan views, respectively, of cross arm 22 shown in FIG. 5.

Figure 11A:
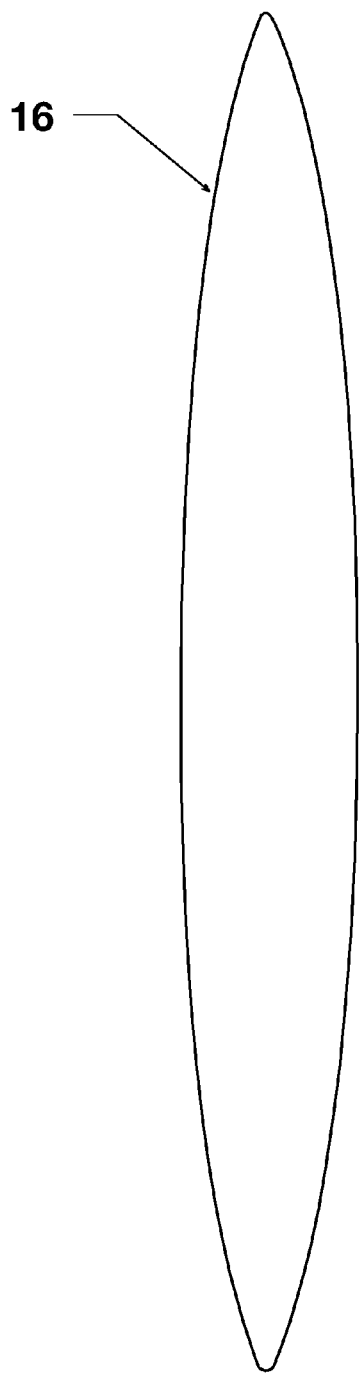
FIGS. 11A and 11B are plan and side views, respectively, of the pod shown in FIG. 1.
Figure 11B:
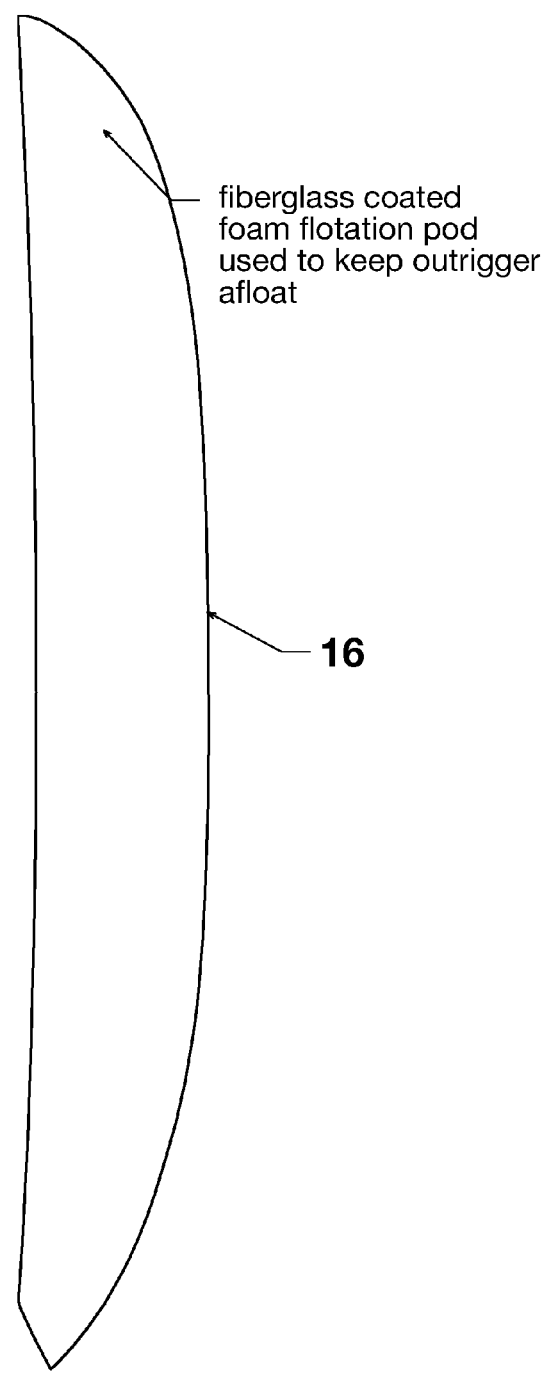

FIGS. 11A and 11B are plan and side views, respectively, of pod 16 shown in FIG. 1. The following should be viewed in light of FIGS. 1-11B. In an exemplary embodiment, the frame includes pod mounting brackets 26, rear mounting bracket 28, and front mounting bracket 30. The flotation pod provides the flotation for the outrigger. In an exemplary embodiment, the pod measures 75"×10"×10;" however, it should be understood that the pod is not limited to these dimensions and other dimensions are included in the spirit and scope of the claimed invention. Any material known in the art can be used for the pod, including, but not limited to foam and fiberglass or rotomolded polyethylene. In an exemplary embodiment, the shape of the pod reflects the shape of the watercraft to which the outrigger is to be attached (hereinafter referred to as the host vessel), for example, a kayak. Such shaping provides the pod with the same qualities as the vessel to which the outrigger is attached. The top of the pod is stiff enough to support the attachment of the frame mounting brackets, described infra.

In an exemplary embodiment, outrigger 10 includes two mounting brackets, for example, brackets 28 and 30. The brackets are attachable to the hull of the host vessel, for example, a kayak. In an exemplary embodiment, the respective flanges 34 and 36 of the brackets are configured to match the surface to which the brackets are to be attached. In an exemplary embodiment, the flanges are slightly curved. Any material known in the art can be used for the brackets. In an exemplary embodiment, the bracket is made of ⅛" thick aluminum. The frame is connected to the bracket using any means known in the art. In an exemplary embodiment, each bracket includes an aluminum plate with flanged tabs welded perpendicularly to the plate. The tabs are used to connect the frame to the bracket by any means known in the art, for example, bolting to the frame.

Advantageously, the outrigger includes a flexible and easy to use means for connecting the brackets to the host vessel. In a preferred embodiment, the brackets include straps 38 that can be wrapped around the host vessel. The straps can be of any material known in the art and can be connected to the brackets and tightened by any means known in the art. In an exemplary embodiment, each bracket includes two ratcheted strap tighteners 40 on the base plates. For example, the straps are placed around the hull of the host vessel and are fed into the ratchets, cinched up tight and secured. In another preferred embodiment, lateral movement of the straps is prevented by any means known in the art, for example, Velcro strips mounted between the mounting plates and the deck of the host vessel.

Pod mounting brackets 26 are located on the end of the frame opposite the front and rear mounting brackets. In an exemplary embodiment, the pod mounting brackets are permanently mounted to the hull of the flotation pod using any means known in the art. In an exemplary embodiment, the pod mounting brackets are flat aluminum plates that are built into the pod. One or more fins 42 are connected to the plates and extend down into the pod for structural support. The frame and the pod mounting brackets are attachable by any means known in the art. In an exemplary embodiment, the pod mounting brackets include tabs 44 perpendicular to the base plates. The tabs enable the frame to bolt to the pod base plates. The fins and tabs can be connected to the brackets by any means known in the art, for example, welding. There are holes drilled that allow bolts to connect the pod mounting brackets to the frame. In an exemplary embodiment, there are three sets of holes that allow for the adjustment of the pod to the frame depending on the size of the host vessel and the weight of the occupant.

In an exemplary embodiment, one or more pieces 46 of polycarbonate plastic (lexan) are fastened to the ribs and cross members by any means known in the art, for example, with aluminum rivets and washers 48. In an exemplary embodiment, piece 46 is a single piece of ⅛" polycarbonate plastic. Pieces 46 strengthen the structural integrity of the frame. It also allows the occupant to see down through the frame to the water beneath. In an exemplary embodiment, solar cells, described infra, are mounted on pieces 46. It should be understood that any suitable material and size and configuration of material known in the art can be used to cover the frame.

In an exemplary embodiment, the solar charging panels are mounted to the frame. Any suitable panels known in the art can be used. Three panels are shown in the figures; however, it should be understood that other numbers of panels are included in the spirit and scope of the claimed invention. The panels are self-contained power generating units connected in parallel and used to charge one or more batteries, described infra, located in the flotation pod. The solar cells are inherently waterproof and are usable in water environments. Built into the solar cell is a solid-state voltage controller (not shown) that manages the electricity generated and charge to the battery. In an exemplary embodiment, the solar cells are bolted to the frame and have modular waterproof wiring terminals, making the outrigger very modular and enabling the user to remove and replace individual cells.

Kayak outrigger 10 includes at least one battery 50. Any battery type known in the art can be connected to the solar panels to store energy generated by the panels and to power an electric motor, described infra, usable to propel the host vessel. In an exemplary embodiment, a 12V deep cycle marine battery (lead/acid type) is located in the body of the flotation pod. The battery sits inside a manufactured battery housing that enables ventilation but is water resistant. In an exemplary embodiment, the housing is secured into the interior of the pod with straps (not shown) having Velcro attachments. This arrangement provides additional security for the battery. Leads, for example, lead 52, are connected to the battery and to the waterproof connectors mounted on the top surface of the pod. In an exemplary embodiment, quick disconnects are used with the leads to allow for the solar cells and motor power cable to be disconnected from the power source quickly and easily. In an exemplary embodiment, the battery is a lithium ion battery, which increases energy storage capability and enables faster recharge time.

In an exemplary embodiment, a present invention outrigger is designed for attachment to medium and large sea kayaks and incorporates one or more solar cells, batteries, and a motor, for example, a 12-volt trolling motor, on an aluminum frame that attaches easily to the kayak. Advantageously, an end user can quickly and easily attach and remove the outrigger without any permanent modifications to the kayak itself.

Basic operations enabled by outrigger 10 include the trolling motor being powered by the deep cycle marine battery, the battery being charged by the solar cells, and the solar cells obtaining power from sunlight.

In an exemplary embodiment, (not shown) a catapult pod is attached to the frame. The catapult ejects a large kite into the air. Rigging provides an easy method to dispense and reel in the line. The kite is used to propel the host vessel.

Figure 12:
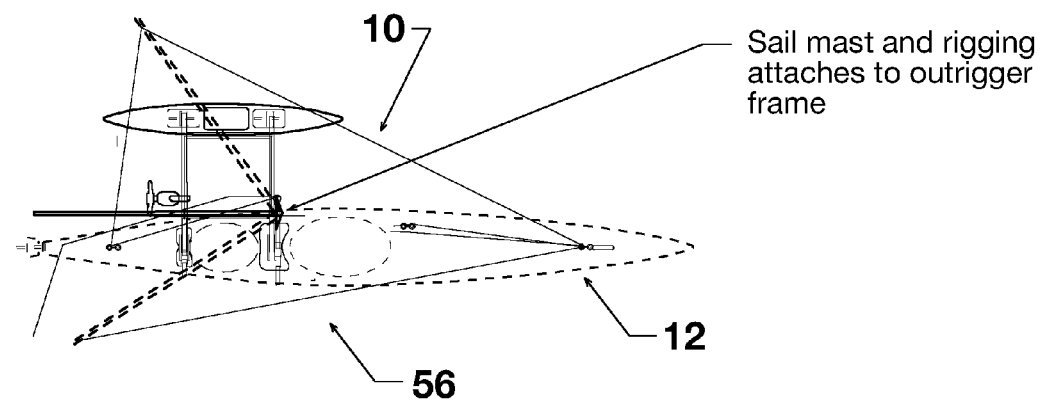
FIG. 12 is a plan view of the kayak outrigger and kayak shown in FIG. 1 with a sail mast and rigging.

FIG. 12 is a plan view of kayak outrigger 10 and kayak 12 shown in FIG. 1 with sail mast 54 and rigging 56.

Figure 13:
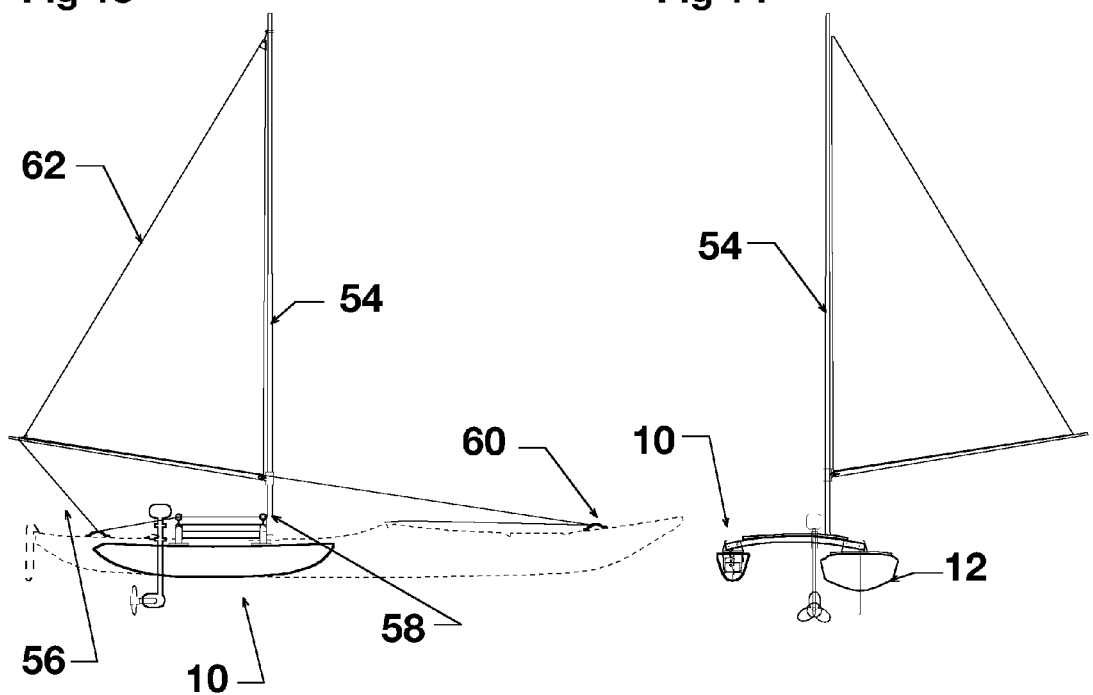
FIG. 13 is a side view of the kayak outrigger and kayak shown in FIG. 12.

FIG. 13 is a side view of kayak outrigger 10 and kayak 12 shown in FIG. 12.

Figure 14:
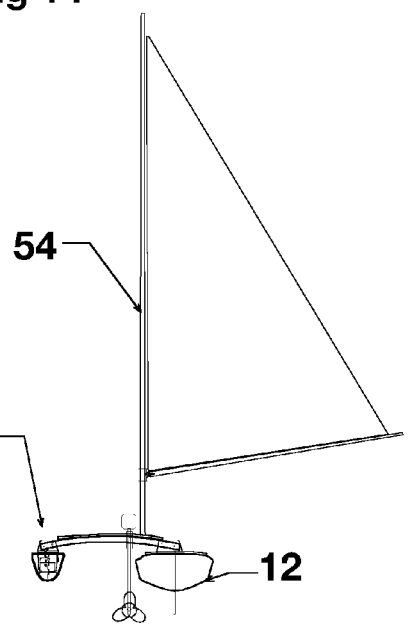
FIG. 14 is an end view of the kayak outrigger and kayak shown in FIG. 12.

FIG. 14 is a side view of kayak outrigger 10 and kayak 12 shown in FIG. 12. The following should be viewed in light of FIGS. 1-14. In an exemplary embodiment, outrigger 10 includes flanged mount 58 for fastening any mast 54 known in the art, including, but not limited to a carbon fiber mast. The mast is usable as a sail rig for using the wind as a propulsion source. Rigging points 60 also can be provided to easily tailor the outrigger as a sail rig. Any combination or configurations of rigging points is included in the scope and spirit of the claimed invention. Mount 58 can be used with or without the motor and cells. The outrigger is configured for quick and simple transition between sail and solar power modes. Any sail 62 known in the art can be used.

Advantageously, a present invention outrigger is self-contained and adaptable to a wide variety of host vessels and configurations. Specifically, the host vessel, for example, a kayak, does not need to be customized or modified in any way for attachment of the outrigger. Thus, the outrigger creates a very stable platform from which to boat, fish, tour, and maneuver the watercraft. For example, the outrigger functions as a flexible water sports platform. Further, the outrigger provides the capability of providing a variety of functionalities to the host vessel, for example, solar powered propulsion, without the necessity of modifying the host vessel.

Although a present invention outrigger is shown with a sea kayak in the figures, it should be understood that the outrigger is not limited to use with a sea kayak. Specifically, the present invention is an outrigger that can be connected to a variety of watercraft and the ability to connect to watercraft other than a sea kayak is included in the spirit and scope of the claimed invention. It should be understood that a present invention outrigger is not limited to the number, type, size, configuration, or material of construction shown for the various components of the outrigger and that other numbers, types, sizes, configurations, and materials of construction for the various components of the outrigger are included in the spirit and scope of the claimed invention.

What I claim is:

1. An outrigger for attachment to a host vessel, comprising:
   a flotation pod;
   a frame connected to the pod and connectable to the host vessel;
   at least one solar cell mounted on the frame;
   a battery connected to the at least one cell; and,
   an electric motor mounted on the frame and connected to the battery.

2. An outrigger for attachment to a host vessel, comprising:
   a flotation pod, separate from the host vessel;
   a frame, separate from the pod and the host vessel and including:
     first and second tubing secured to the flotation pod at respective first ends and including respective second ends, opposite the respective first ends;
     a first mounting bracket fixed to the second end of the first tubing and including:
       a first flange plate arranged to engage a surface of the host vessel;
       a first strap disposed in the first mounting bracket and arranged to encircle a first portion of the host vessel; and,
       a first strap tightener arranged to tighten the first strap with respect to the first mounting bracket and the first portion of the host vessel; and,
     a second mounting bracket fixed to the second end of the second tubing and including:
       a second flange plate arranged to engage the surface of the host vessel;
       a second strap disposed in the second mounting bracket and arranged to encircle a second portion of the host vessel; and,
       a second strap tightener arranged to tighten the second strap with respect to the second mounting bracket and the second portion of the host vessel;
   at least one solar cell mounted on the frame;
   a battery mounted on the frame and connected to the at least one solar cell; and,
   an electric motor mounted on the frame and connected to the battery.

3. An outrigger for attachment to a host vessel, comprising:
   a flotation pod, separate from the host vessel;
   a frame, separate from the pod and the host vessel and including:
     first and second tubing secured to the flotation pod;
     first and second mounting brackets fixed to the first and second tubing, respectively, and including:
       respective flange plates arranged to engage the host vessel;
       respective straps arranged to encircle respective portions of the host vessel; and,
       respective strap tighteners arranged to fix the first and second mounting brackets with respect to the host vessel;
   at least one solar cell mounted on the frame;
   a battery mounted on the frame and connected to the at least one solar cell;
   an electric motor mounted on the frame and connected to the battery; and,
   a mast mount connected to the frame and arranged to receive a mast for a sail.

* * * * *